(12) United States Patent
Robertson et al.

(10) Patent No.: US 7,350,576 B2
(45) Date of Patent: Apr. 1, 2008

(54) METHODS OF SEALING SUBTERRANEAN FORMATIONS USING RAPID SETTING PLUGGING COMPOSITIONS

(75) Inventors: Bruce Robertson, Newmachar (GB); Ian A. Fowler, Abrdeen (GB)

(73) Assignee: Halliburton Energy Services, Inc., Duncan, OK (US)

( * ) Notice: Subject to any disclaimer, the term of this patent is extended or adjusted under 35 U.S.C. 154(b) by 444 days.

(21) Appl. No.: 11/205,905

(22) Filed: Aug. 17, 2005

(65) Prior Publication Data

US 2007/0039735 A1    Feb. 22, 2007

(51) Int. Cl.
*E21B 33/138* (2006.01)
*E21B 21/00* (2006.01)

(52) U.S. Cl. .................. 166/294; 166/292; 166/300; 175/64; 175/72; 507/140; 507/269

(58) Field of Classification Search .................. None
See application file for complete search history.

(56) References Cited

U.S. PATENT DOCUMENTS

| | | | |
|---|---|---|---|
| 1,019,083 A | 3/1912 | Pink | |
| 1,634,505 A | 7/1927 | McCaughey | |
| 2,351,641 A | 6/1944 | Sohl et al. | |
| 2,543,959 A | 3/1951 | Eastin | |
| 2,862,881 A * | 12/1958 | Reddie | 507/135 |
| 2,939,799 A | 6/1960 | Chishold | |
| 3,046,221 A * | 7/1962 | Dodd | 507/106 |
| 3,320,077 A | 5/1967 | Prior | |
| 3,816,148 A | 6/1974 | Barthel | |
| 3,951,885 A | 4/1976 | Thompson | |
| 3,963,849 A | 6/1976 | Thompson | |
| 4,158,570 A | 6/1979 | Irwin | |
| 4,209,339 A | 6/1980 | Smith-Johannsen | |
| 4,352,694 A | 10/1982 | Smith-Johannsen | |

(Continued)

FOREIGN PATENT DOCUMENTS

EP    0 142 116    5/1985

(Continued)

OTHER PUBLICATIONS

Halliburton brochure entitled "The halliburton ChannelSeal™ Process" dated 2002.

(Continued)

*Primary Examiner*—Zakiya W. Bates
*Assistant Examiner*—Angela DiTrani
(74) *Attorney, Agent, or Firm*—Craig W. Roddy; Groover & Holmes

(57) ABSTRACT

Methods for using rapid setting plugging compositions comprising oil, clay, magnesium chloride, and magnesium oxide powder to seal permeable zones in subterranean formations are provided. The permeable zones may be sealed by passing the plugging composition and water to the subterranean formation. While being exposed to downhole temperatures in a range of from about 0° F. to about 500° F., the plugging composition quickly thickens to form a sealing mass that is substantially impermeable to fluid in less than about 1 minute after contacting the water. It then usually develops an effective amount of compressive strength to prevent it from being washed away within a period ranging from about 5 minutes to about 2 hours at temperatures ranging from about 0° F. to about 500° F.

33 Claims, 2 Drawing Sheets

U.S. PATENT DOCUMENTS

| | | |
|---|---|---|
| 4,480,693 A | 11/1984 | Newlove et al. |
| 4,670,056 A | 6/1987 | Alsdorf et al. |
| 4,737,295 A * | 4/1988 | Cowan et al. .............. 507/103 |
| 4,886,550 A | 12/1989 | Alexander |
| 5,004,505 A | 4/1991 | Alley et al. |
| 5,039,454 A | 8/1991 | Policastro et al. |
| 5,110,361 A | 5/1992 | Alley et al. |
| 5,213,161 A | 5/1993 | King et al. |
| 5,220,960 A | 6/1993 | Totten et al. |
| 5,228,524 A | 7/1993 | Johnson et al. |
| 5,281,270 A | 1/1994 | Totten et al. |
| 5,298,069 A | 3/1994 | King et al. |
| 5,504,062 A | 4/1996 | Johnson |
| 5,913,364 A | 6/1999 | Sweatman |
| 5,921,319 A | 7/1999 | Curtice |
| 6,060,434 A | 5/2000 | Sweatman et al. |
| 6,138,759 A | 10/2000 | Chatterji et al. |
| 6,167,967 B1 | 1/2001 | Sweatman |
| 6,258,757 B1 | 7/2001 | Sweatman et al. |
| 6,315,042 B1 | 11/2001 | Griffith et al. |
| 6,328,106 B1 | 12/2001 | Griffith et al. |
| 6,390,195 B1 | 5/2002 | Nguyen et al. |
| 6,401,817 B1 | 6/2002 | Griffith et al. |
| 6,448,206 B1 | 9/2002 | Griffith et al. |
| 6,503,870 B2 | 1/2003 | Griffith et al. |
| 6,524,384 B2 | 2/2003 | Griffith et al. |
| 6,561,273 B2 | 5/2003 | Brothers et al. |
| 6,592,660 B2 | 7/2003 | Nguyen et al. |
| 6,664,215 B1 | 12/2003 | Tomlinson |
| 6,666,268 B2 | 12/2003 | Griffith et al. |
| 6,668,929 B2 | 12/2003 | Griffith et al. |
| 6,716,282 B2 | 4/2004 | Griffith et al. |
| 6,887,833 B2 | 5/2005 | Brothers et al. |
| 6,908,508 B2 | 6/2005 | Brothers |
| 2004/0040711 A1 | 3/2004 | Tomlinson |
| 2005/0034867 A1 | 2/2005 | Griffith et al. |

FOREIGN PATENT DOCUMENTS

| | | |
|---|---|---|
| EP | 0 558 232 A1 | 1/1993 |
| EP | 0 582 367 A1 | 2/1994 |
| EP | 1 365 104 A1 | 11/2003 |
| RU | 2015155 | 6/1994 |
| RU | 2060360 | 5/1996 |
| WO | WO 01/93842 A3 | 12/2001 |

OTHER PUBLICATIONS

Halliburton brochure entitled "FlexPlug® OBM Lost-Circulation Material" dated 2004.

Halliburton brochure entitled "FlexPlug® W Lost-Circulation Material" dated 2004.

Halliburton brochure entitled "Thermatek Service" dated 2005.

Robertson, Bruce et al., "Rapid Setting Plugging Compositions for Sealing Subterranean Formations" filed Aug. 17, 2005 as U.S. Appl. No. 11/205,902.

XP-002421633, Derwent Publications Ltd., dated Jun. 23, 1981 by Tolkachev.

Foreign communication related to a counterpart application dated Mar. 6, 2007.

* cited by examiner

METHODS OF SEALING SUBTERRANEAN FORMATIONS USING RAPID SETTING PLUGGING COMPOSITIONS

FIELD OF THE INVENTION

The present invention generally relates to oil and gas recovery, and more particularly to sealing permeable zones within subterranean formations using rapid setting plugging compositions.

BACKGROUND AND SUMMARY OF THE INVENTION

The following paragraphs contain some discussion, which is illuminated by the innovations disclosed in this application, and any discussion of actual or proposed or possible approaches in this Background section does not imply that those approaches are prior art.

Natural resources such as oil and gas residing in a subterranean formation or zone are usually recovered by forming wells through the formation. The formation of a well first involves drilling a wellbore down to the subterranean formation while circulating a drilling fluid in the wellbore. The drilling fluid is usually circulated downwardly through the interior of a drill pipe and upwardly through the annulus, which is located between the exterior of the pipe and the walls of the wellbore. After terminating the circulation of the drilling fluid, a string of pipe, e.g., casing, is run in the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

One problem commonly encountered while drilling and cementing the wellbore is the presence of one or more permeable zones in the subterranean formation. The permeable zones may be, for example, vugs, voids, naturally occurring fractures, or induced fractures that occur when weak zones have fracture gradients exceeded by the hydrostatic pressure of the drilling fluid or the cement slurry. In some cases, weak zones may contain pre-existing fractures that expand under the hydrostatic pressure of the drilling fluid or the cement slurry. During the drilling operation, such permeable zones may result in the loss of the drilling fluid circulation in the wellbore such that the drilling operation must be delayed for technical or commercial reasons. Further, during the cementing operation, at least a portion of the cement slurry may be lost to the subterranean formation due to the presence of such permeable zones. Consequently, the cement slurry may fail to completely fill the annulus from top to bottom. Dehydration of the cement slurry also may occur, compromising the strength of the cement that forms in the annulus.

Traditional methods of overcoming the above described problem include sealing the permeable zones using thixotropic cements, bentonite diesel oil, bentonite cement diesel oil, and sodium silicate solutions in combination with calcium salt sweeps. However, these materials have their own share of limitations. For example, they may lack sufficient compressive strength to adequately plug the permeable zones, particularly if they become contaminated with the drilling fluid. Further, they often develop compressive strength very slowly, extending the period of time required to complete the formation of the wellbore. Well fluids containing flaky materials, e.g., mica and shredded cellophane, or granular materials, e.g., ground nutshells and carbonates, have also been developed to seal permeable zones. However, the flaky or granular materials may be washed away from highly permeable zones by the fluids being circulated through the wellbore. The foregoing plugging materials also may be difficult to remove from the permeable zones when hydrocarbon production is required, resulting in damage to the formation. A need therefore exists to develop improved materials for preventing the lost circulation of fluids during the formation of wells in subterranean formations.

Methods of Sealing Subterranean Formations Using Rapid Setting Plugging Compositions Some teachings and advantages found in the present application are summarized briefly below. However, note that the present application may disclose multiple embodiments, and not all of the statements in this Summary section necessarily relate to all of those embodiments. Moreover, none of these statements limit the claims in any way.

Rapid setting plugging compositions comprising oil, clay, magnesium chloride, and magnesium oxide powder may be used to seal permeable zones in subterranean formations. The permeable zones may be sealed by passing the plugging composition and water to the subterranean formation. While being exposed to downhole temperatures in a range of from about 0° F. to about 500° F., the plugging composition quickly thickens to form a sealing mass that is substantially impermeable to fluid in less than about 1 minute after contacting the water. It then usually rapidly develops an effective amount of compressive strength to prevent it from being washed away to the loss zone within a period ranging from about 5 minutes to about 2 hours at temperatures ranging from about 0° F. to about 500° F.

The compressive strength of the plugging composition after it has fully set is generally sufficient such that it effectively blocks fluid flow through the permeable zones. Therefore, it can prevent the lost circulation of fluids, such as the drilling fluid or the cement slurry, in the wellbore. The use of the rapid setting plugging composition also ensures that a drilling or cementing operation would not be significantly delayed by the presence of such permeable zones in the subterranean formation. Another advantage of the plugging composition is that the sealing mass it forms in the permeable zones may be removed by dissolving it with an acid solution. As such, the subterranean formation may be prepared for hydrocarbon production without being concerned that the formation might be damaged.

DETAILED DESCRIPTION OF THE PREFERRED EMBODIMENTS

Figure 1:
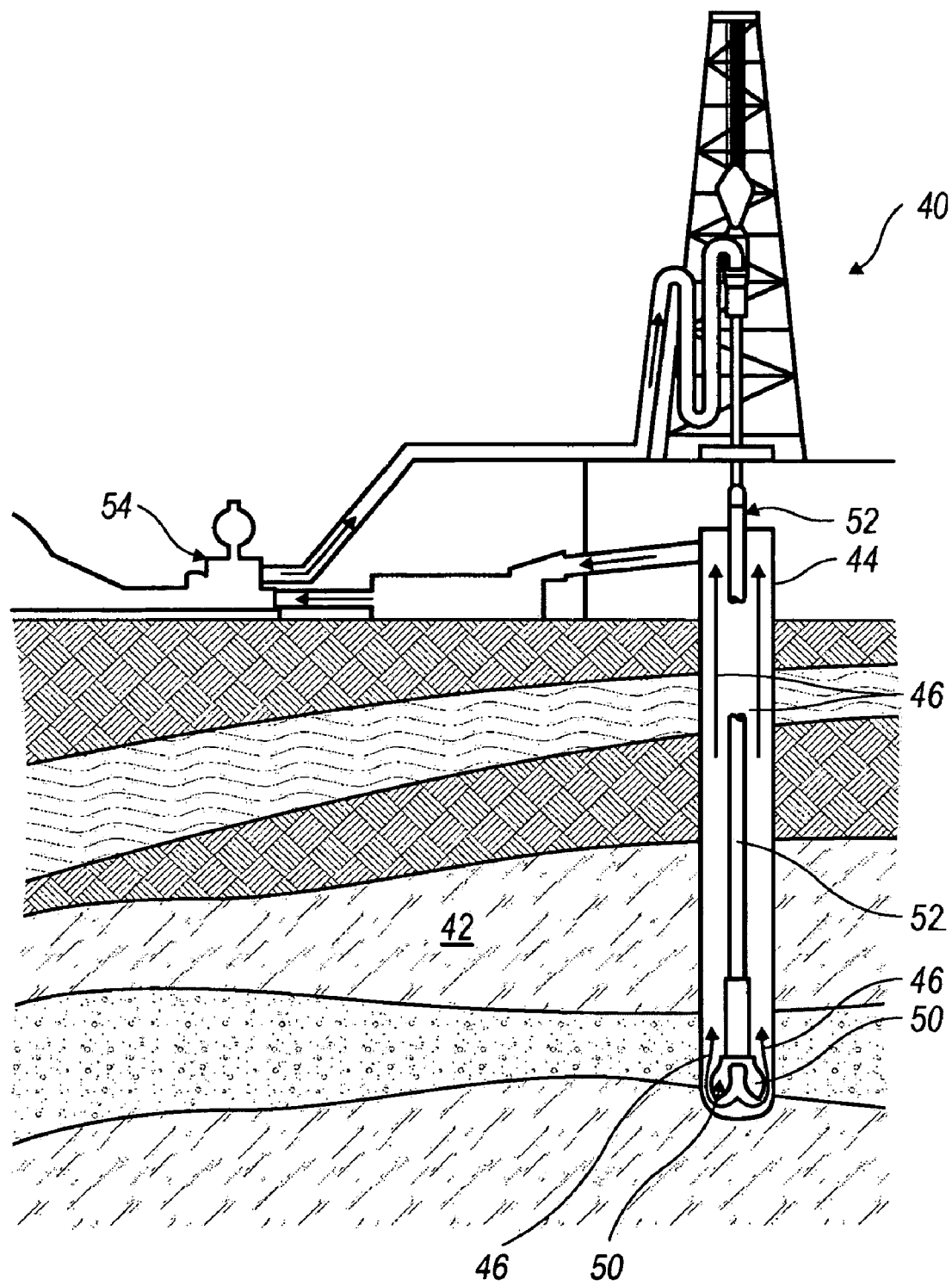
FIG. 1 illustrates the drilling of a wellbore through a subterranean formation during which a rapid setting plugging composition is employed to seal the formation to prevent the lost circulation of the drilling fluid.

Plugging compositions for sealing a subterranean formation include an oil, a clay, magnesium chloride, and magnesium oxide powder. This type of plugging composition is sufficiently viscous to allow it to be displaced into a permeable zone in a subterranean formation where it may be contacted with an effective amount of water to cause it to set. Upon contacting the water, the plugging composition may rapidly form a rigid sealing mass in less than about 1 minute. As used herein, a "sealing mass" refers to a material that is substantially impermeable to fluid, wherein the sealing mass typically has a putty-link consistency. In addition, contacting the water may cause the compressive strength of the plugging compositions to develop quickly. In various embodiments, the compressive strength may increase to in a range of from about 50 psi to about 1,000 psi, alternatively from about 180 psi to about 1,000 psi, over a period of from about 5 minutes to about 2 hours, alternatively from about 10 minutes to about 90 minutes, when subjected to temperatures in the range of from about 0° F. to about 500° F. The compressive strength increases as a function of time and temperature. Further, the density of the plugging composition may range from about 6 pounds per gallon (ppg) to about 18 ppg and is desirably about 8 ppg.

The plugging compositions may contain an effective amount of the base oil to render the compositions pumpable such that the magnesium chloride and the magnesium oxide powder may be conveyed to the subterranean formation where they are contacted with water. Examples of suitable oils include but are not limited to diesel oil, mineral oil, kerosene, vegetable oils, synthetic oils, esters, olefins, or combinations thereof. In an embodiment, the oil contained in the plugging compositions is diesel oil. The amount of the oil present in a plugging composition may be in the range of from about 30% to about 70%, alternatively about 54%, by weight of the plugging composition.

The plugging compositions may also contain an effective amount of the clay to dispel the oil in the presence of water and to act as the base fluid for dissolving the magnesium chloride. In addition to serving as a suspension agent, the clay also serves to further increase the viscosity of the plugging compositions. Examples of suitable clays include sorptive clays such as filler's earth type clays. In an embodiment, the clay is attapulgite. The amount of the clay present in a plugging composition may be in the range of from about 5% to about 25% by weight of the plugging composition. In an embodiment, the plugging composition contains about 15% of the clay by weight of the composition.

The plugging compositions may further include sufficient amounts of the magnesium oxide powder and the magnesium chloride salt to react in the presence of water to form magnesium oxychloride. The plugging compositions undergo a phase transition from a liquid to a gel to a solid as a result of this reaction. A suitable magnesium oxide powder is commercially available from Halliburton Energy Services, Inc. under the trade name of THERMATEK LT powder. Alternatively, the magnesium oxide powder may be formed from magnesite, magnesium carbonate, or synthetic magnesium hydroxide by high temperature calcination. The amount of the magnesium oxide present in a plugging composition may be in the range of from about 10% to about 40% by weight of the plugging composition. In an embodiment, the plugging composition contains about 23% of the magnesium oxide by weight of the composition.

A suitable magnesium chloride salt for use in the plugging compositions is commercially available from Halliburton Energy Services, Inc. under the tradename of C-TEK salt. Any combination of the foregoing commercially available magnesium chloride salts also may be used in the plugging compositions. The amount of the magnesium chloride present in the plugging composition may be in the range of from about 5% to about 25%, alternatively about 11% by weight of the plugging composition. In an embodiment, the plugging composition contains about 11% of the magnesium chloride by weight of the composition. Additional information related to forming magnesium oxychloride may be found in U.S. Pat. No. 6,664,215 and U.S. Patent Application No. 2004/0040711, both of which are incorporated by reference herein in their entirety.

As deemed appropriate by one skilled in the art, additional additives may be added to the plugging compositions for improving or changing the properties thereof. Examples of such additives include but are not limited to weighting agents such as barite and calcium carbonate and viscosifying agents such as lime and standard oil-based mud dispersants.

The plugging compositions may be prepared by combining the clay, the magnesium chloride, and the magnesium oxide powder with the base oil, followed by mixing them at a shear rate sufficient to disperse the magnesium chloride and the magnesium oxide powder throughout the base oil. The plugging compositions may be prepared off-site and then transported by, e.g., truck, train, or ship, to the on-site location (e.g., a drilling platform) near where it is to be used. In this case, the plugging compositions may be stored either off-site or on-site until their use is required. Alternatively, they may be prepared on-site, particularly when a lost circulation problem has been discovered during drilling or cementing. The components of the plugging compositions may be mixed in batches or in a continuous mixing operation in which they are pumped directly into the wellbore.

FIG. 1 illustrates the drilling of a wellbore 44 through the earth 42 down to a subterranean formation (not shown) during which the previously described plugging composition may be used to seal the formation. A drill rig 40 for drilling wellbore 44 is depicted. A drill bit 50 may be mounted on the end of a drill string 52 comprising several sections of drill pipe. The wellbore 44 may be drilled by using a rotary drive at the surface to rotate drill string 52 and to apply torque and force to urge drill bit 50 to extend through wellbore 44. The drilling fluid may be displaced through drill string 52 using one or more pumps 54. The drilling fluid may be circulated past drill bit 50 and back to the surface through the annulus of wellbore 44 as indicated by arrows 46, thereby removing drill cuttings (i.e., material such as rock generated by the drilling) from the wellbore. Although not shown, it is understood that additional conduits besides drill string 52 may also be disposed within wellbore 44.

Unfortunately, the subterranean formation may contain permeable zones through which the drilling fluid may migrate from wellbore 44 into the formation. These permeable zones may be, for example, fractures, fissures, streaks, voids, vugs, and the like. The presence of such permeable zones in the subterranean formation may cause the circulation of the drilling fluid in wellbore 44 to be lost such that the fluid tends to not flow back to the surface of the earth 42. To maintain good circulation of the drilling fluid in wellbore 44, the plugging composition described herein may be passed into wellbore 44 where it is contacted with a water-containing fluid. In various embodiments, the plugging composition may be pumped down one or more conduits 52 while the water-containing fluid is concurrently pumped down the annulus of wellbore 44 in the direction opposite of arrows 46, or vice versa. The annulus may be disposed between one or more conduits 52 and the wall of wellbore 44. In some embodiments, conduit 52 may comprise mud motors and a drilling assembly such as a drill string, coiled tubing, or work-string through which the water-containing fluid passes. It is understood that in additional embodiments, the annulus of wellbore 44 may be interposed between two conduits rather than between a conduit and the wall of wellbore 44. The mass flowrate ratio of the plugging composition to the water-containing fluid being pumped to the subterranean formation may be in the range of from about 1:1 to about 10:1, alternatively from about 3:1 to about 4:1. The plugging composition usually undergoes shear thinning as it is pumped into wellbore 44. Examples of suitable water-containing fluids include but are not limited to fresh water, a water-based drilling fluid, salt water, e.g., an unsaturated aqueous salt solution or a saturated aqueous salt solution such as brine or seawater, or combinations thereof. In alternative embodiments in which water produced by the subterranean formation flows into wellbore 44, the plugging composition may be pumped via one or more conduits 52 to where the water is located, thereby allowing the composition to be placed without the need to remove the conduits/mud motors/drilling assembly.

While co-mingling with the water, the plugging composition may be pumped into the permeable zones. The water may react with the clay in the plugging composition, thereby expelling the oil. The water also acts as the base fluid for the reaction between the magnesium chloride and the magnesium oxide powder, which forms magnesium oxychloride. This reaction may occur at downhole temperatures ranging from about 0° F. to about 500° F. As a result of this reaction, the plugging composition may form a putty-like fluid of moldable consistency that significantly reduces fluid flow through the permeable zones. As a result of the foregoing reaction, the plugging composition may develop compressive strength rapidly. The plugging composition thus quickly sets into a rigid sealing mass that is substantially impermeable to fluid (i.e., no fluid or only a small amount of fluid can pass through the mass). After setting, the plugging composition desirably cannot be washed out of the permeable zones. As such, the circulation of the drilling fluid through wellbore 44 may be resumed without being concerned that it might escape from wellbore into the subterranean formation, undesirably resulting in lost circulation of the fluid.

After the drilling of wellbore 44 is completed, drill string 52 and drill bit 50 may be removed from wellbore 44, followed by placing a casing in wellbore 44. Primary cementing may then be performed by pumping a cement slurry down the casing and into the annulus between the casing and the wall of wellbore 44. The set plugging composition desirably blocks the permeable zones, thus preventing the cement slurry from flowing into the subterranean formation. As a result, the hydrostatic pressure of the cement slurry may be maintained such that the slurry returns to the surface and forms a relatively strong cement column in the annulus of the wellbore.

Subsequent removal of the set plugging composition from the permeable zones may be required for, among other things, allowing the wellbore to be utilized in hydrocarbon production. If desired, the plugging composition may be easily removed from the permeable zones by drilling through it. In an embodiment in which the wellbore extends through a producing formation that is not sensitive to acid, any plugging composition remaining in the permeable zones after the drill-through may be dissolved with an acidic solution. An example of a suitable acidic solution in which the set plugging composition is highly soluble is a hydrochloric acid aqueous solution comprising from about 7.5% to about 28% hydrochloric acid by weight of the solution. The weight ratio of the required amount of the hydrochloric acid solution to the amount of the plugging composition may be about 10:1.

Modifications and Variations

One problem commonly encountered during the placement of a cement slurry in a wellbore is unwanted gas migration from the subterranean formation into and through the cement slurry. Gas migration is caused by the behavior of the cement slurry during a transition phase in which the cement slurry changes from a true hydraulic fluid to a highly viscous mass showing some solid characteristics. When first placed in the annulus, the cement slurry acts as a true liquid and thus transmits hydrostatic pressure. However, during the transition phase, certain events occur that cause the cement slurry to lose its ability to transmit hydrostatic pressure. One of those events is the loss of fluid from the slurry to the subterranean zone. Another event is the development of static gel strength, i.e., stiffness, in the slurry. As a result, the pressure exerted on the formation by the cement slurry falls below the pressure of the gas in the formation such that the gas begins to migrate into and through the cement slurry. Eventually the gel strength of the cement slurry increases to a value sufficient to resist the pressure exerted by the gas in the formation against the slurry.

The flow channels formed in the cement during such gas migration undesirably remain in the cement once it has set. Those flow channels can permit further migration of fluid through the cement. Thus, the cement residing in the annulus may be ineffective at maintaining the isolation of the subterranean formation. As such, gas may undesirably leak to the surface or to other subterranean formations. An expensive remedial squeeze cementing operation may be required to prevent such leakage. However, the gas leakage may further cause high volume blow-outs shortly after cement replacement and before the cement has initially set.

To overcome the foregoing problems caused by gas migration, a plugging composition described herein may be pumped to areas of the subterranean formation through which gas is flowing into the wellbore prior to performing a cementing operation. As described above, the plugging composition may be contacted with water downhole, causing it to set into a rigid, sealing mass that is substantially impermeable to the gas. Accordingly, the set plugging composition probably would block the gas from migrating into and through a cement slurry subsequently pumped into the wellbore, thus preventing the integrity of the cement formed in the wellbore from being compromised. The presence of the plugging composition may also prevent any blow-outs from occurring.

The foregoing rapid setting plugging compositions may be pumped down various types of wells, including injection wells, single production wells such as oil and gas wells, and multiple completion wells.

EXAMPLES

The invention having been generally described, the following examples are given as particular embodiments and to demonstrate the practice and advantages thereof. It is understood that the examples are given by way of illustration and are not intended to limit the specification or the claims to follow in any manner. Preparation for the following examples involved obtaining a 1 Liter (L) measuring cylinder, a 250 milliliter (mL) measuring cylinder, digital scales accurate to 0.01 gram, a 1 L beaker, and two 0.5 L beakers.

Example 1

A sample of the plugging composition described herein was prepared by first measuring out 769 mL of diesel oil, followed by placing the diesel oil in a Waring blender and mixing it at a relatively low rate. Next, 167 grams (g) of attapulgite, 128 g of C-TEK magnesium chloride salt, and 256 g of THERMATEK LT magnesium oxide powder were sequentially weighed out and added to the diesel oil while continuing to mix the solution in the Waring blender.

Thereafter, 150 mL of the rapid setting plugging composition was measured into a beaker. Then 50 mL of fresh water was added to the beaker, followed by mixing together the two fluids using an over-head stirrer. The time required for the resulting slurry to form a fluid of moldable consistency was then determined to be less than 1 minute by observing the composition. It was observed that the diesel oil was expelled from the plugging composition during this time. The slurry was then placed into an oven preheated to a temperature of 150° F. to allow it to set into a rigid mass. The foregoing procedure was repeated using sea water and then again using water-based mud.

Figure 2:
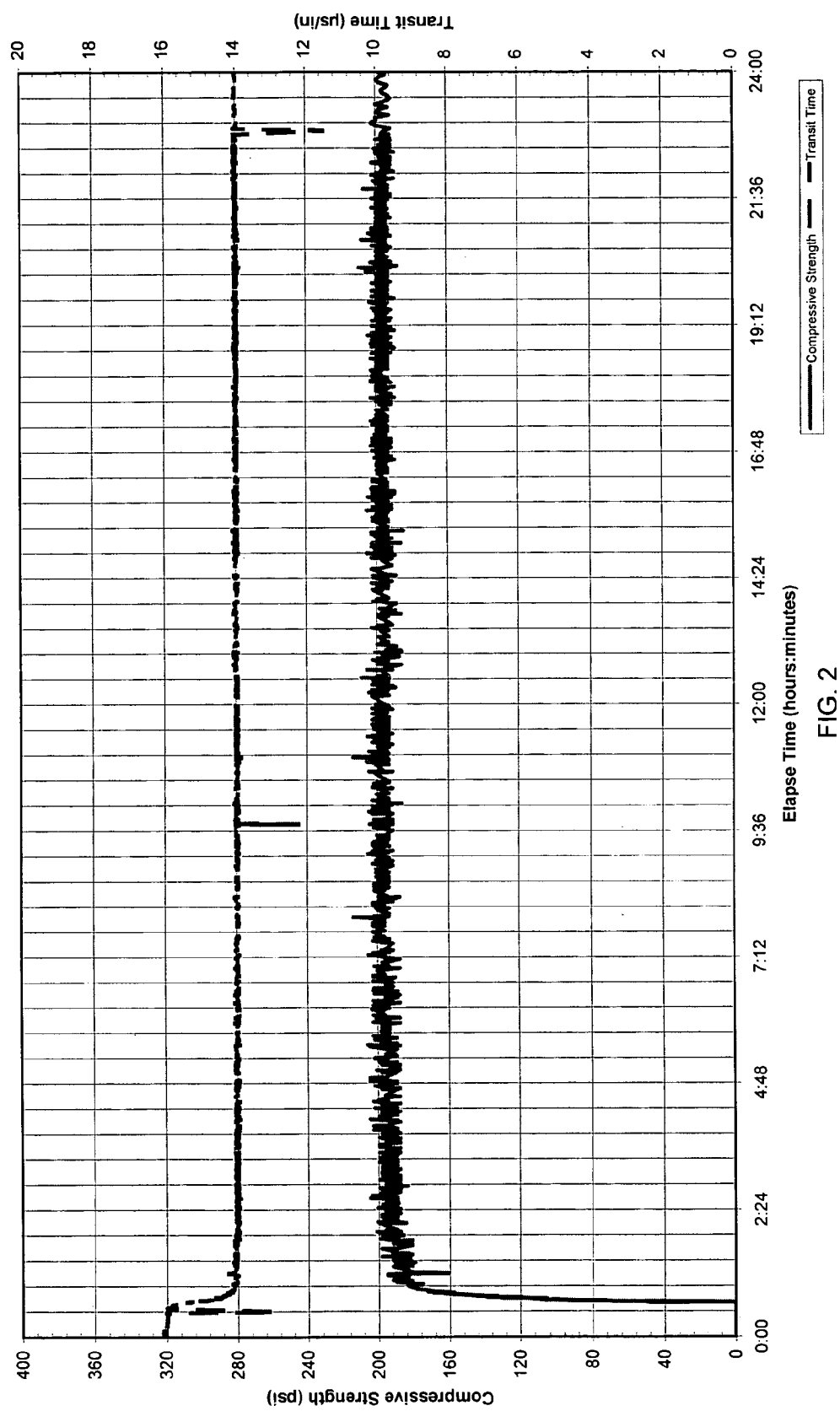
FIG. 2 illustrates the development of the compressive strength and the transition time of a rapid setting plugging composition, both as a function of the elapsed time after contacting it with water.

As shown in FIG. 2, the compressive strength of the plugging composition after mixing it with fresh water was monitored over time using an Ultrasonic Compressive Analyzer (UCA) set at 150° F. A description of the UCA procedure may be found in American Petroleum Institute (API) Best Practices 10B, 22nd Edition, December 1997, Section 8, which is entitled "Non-Destructive Sonic Testing of Cement." The compressive strength quickly increased and then leveled off in the range of from about 180 psi to about 200 psi in less than two hours. After 12 hours had elapsed, the compressive strength was 196 psi; after 16 hours had elapsed, it was 193 psi; and after 18 hours had elapsed it was 196 psi. In addition, as illustrated in FIG. 2, the transition time of the plugging composition while being heated at 150° F. was also monitored. It immediately peaked at almost 16 μs/in (microseconds per inch) and then quickly dropped to and leveled off at about 14 μs/in.

Example 2

An aqueous solution containing 15% HCl by weight of the solution was placed in a beaker. A plugging composition was prepared, mixed with water, and allowed to set in the manner described in Example 1. The set plugging composition was then placed in the 15% HCl solution and observed. This procedure was repeated using an aqueous solution containing 28% HCl by weight of the solution. The set plugging composition fully dissolved in both HCl solutions within 2 hours.

According to various embodiments, methods of sealing a subterranean formation comprise: preparing a plugging composition comprising oil, clay, magnesium chloride, and magnesium oxide powder; and contacting the plugging composition with water in the subterranean formation such that the plugging composition forms a sealing mass in the subterranean formation, thereby substantially blocking fluid flow through the subterranean formation. In additional embodiments, methods of drilling a wellbore through a subterranean formation, comprise: applying torque to a bit within a wellbore and applying force to urge the bit to extend through the wellbore while circulating a drilling fluid past the bit; separately displacing a plugging composition and water down the wellbore to a permeable zone in the subterranean formation such that they contact each other, wherein the plugging composition comprises oil, clay, magnesium chloride, and magnesium oxide powder; and allowing the plugging composition to set within the permeable zone. In yet more embodiments, methods of sealing a subterranean formation comprise: contacting a plugging composition and water in the subterranean formation, thereby causing the plugging composition to form a sealing mass in less than about 1 minute. In still more embodiments, methods of sealing a subterranean formation comprise: contacting a plugging composition and water in the subterranean formation, thereby causing the plugging composition to develop a compressive strength of from about 180 psi to about 500 psi over a period of from about 5 minutes to about 2 hours.

In more embodiments, plugging compositions for use in sealing a subterranean formation comprise: oil, clay, magnesium chloride, and magnesium oxide powder. In yet more embodiments, plugging compositions for use in sealing a subterranean formation comprise: diesel oil, attapulgite, magnesium chloride, and magnesium oxide powder present in amounts effective to form a sealing mass that is substantially impermeable to fluid upon contacting water. In still more embodiments, plugging compositions for use in sealing a subterranean formation are capable of forming a sealing mass within a period of less than about 1 minute and of developing a compressive strength of from about 180 psi to about 500 psi over a period of from about 5 minutes to about 2 hours upon contact with water.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of sealing a permeable zone within a subterranean formation, comprising:
preparing a plugging composition comprising oil, clay, magnesium chloride, and magnesium oxide powder; and
contacting the plugging composition with water in the subterranean formation such that the plugging composition forms a sealing mass, thereby substantially sealing a permeable zone within the subterranean formation.

2. The method of claim 1, wherein the plugging composition forms the sealing mass in less than about 1 minute after it contacts the water when it is subjected to a temperature in a range of from about 0° F. to about 500° F.

3. The method of claim 1, wherein a compressive strength of the plugging composition increases to in a range of from about 50 psi to about 1,000 psi over a period of from about 5 minutes to about 2 hours after it contacts the water.

4. The method of claim 1, wherein the plugging composition is pumped down through a conduit disposed in a wellbore.

5. The method of claim 4, wherein the conduit comprises a mud motor and a drilling assembly through which the plugging composition passes.

6. The method of claim 1, wherein the water is pumped down through an annulus of a wellbore and the plugging composition is concurrently pumped down through a conduit disposed in the wellbore.

7. The method of claim 1, wherein the water is pumped down through a conduit disposed in a wellbore, and the plugging composition is concurrently pumped down through an annulus of the wellbore.

8. The method of claim 1, wherein a mass flowrate ratio of the plugging composition to a water-containing fluid being pumped to the subterranean formation is in a range of from about 1:1 to about 10:1.

9. The method of claim 1, wherein a mass flowrate ratio of the plugging composition to a water-containing fluid being pumped to the subterranean formation is in a range of from about 3:1 to about 4:1.

10. The method of claim 1, wherein said contacting the plugging composition with the water is performed prior to pumping a cement composition into a wellbore penetrating the subterranean formation.

11. The method of claim 1, wherein the clay comprises attapulgite.

12. The method of claim 1, wherein the oil comprises diesel oil, mineral oil, kerosene, vegetable oils, synthetic oils, esters, olefins, or combinations thereof.

13. The method of claim 1, wherein an amount of the oil present in the plugging composition is in a range of from about 30% to about 70% by weight of the plugging composition.

14. The method of claim 1, wherein an amount of the clay present in the plugging composition is in a range of from about 5% to about 25% by weight of the plugging composition.

15. The method of claim 1, wherein an amount of the magnesium chloride present in the plugging composition is in a range of from about 5% to about 25% by weight of the plugging composition.

16. The method of claim 1, wherein an amount of the magnesium oxide present in the plugging composition is in a range of from about 10% to about 40% by weight of the plugging composition.

17. The method of claim 1, further comprising removing the sealing mass from the permeable zone by drilling through it.

18. The method of claim 1, further comprising dissolving the sealing mass with an acidic solution.

19. The method of claim 1, further comprising dissolving the sealing mass with a hydrochloric acid aqueous solution comprising from about 7.5% to about 28% hydrochloric acid by weight of the solution.

20. The method of claim 19, wherein a weight ratio of the hydrochloric acid solution to the sealing mass is about 10:1.

21. The method of claim 1, wherein the plugging composition is prepared off-site and transported to near the subterranean formation.

22. The method of claim 1, wherein the plugging composition is prepared on-site.

23. A method of drilling a wellbore through a subterranean formation, comprising:
    applying torque to a bit within a wellbore and applying force to urge the bit to extend through the wellbore while circulating a drilling fluid past the bit; and
    separately displacing a plugging composition and water down the wellbore to a permeable zone in the subterranean formation such that they contact each other, wherein the plugging composition comprises oil, clay, magnesium chloride, and magnesium oxide powder; and
    allowing the plugging composition to set within the permeable zone.

24. The method of claim 23, further comprising drilling through the set plugging composition to allow oil or gas to flow into the wellbore.

25. The method of claim 23, wherein the plugging composition is pumped down through a conduit disposed in a wellbore and the water is concurrently pumped down through an annulus of the wellbore.

26. The method of claim 23, wherein the water is pumped down through a conduit disposed in a wellbore and the plugging composition is concurrently pumped down through an annulus of the wellbore.

27. The method of claim 23, wherein the plugging composition forms a sealing mass in less than about 1 minute after it contacts the water when it is subjected to a temperature in a range of from about 0° F. to about 500° F.

28. The method of claim 23, wherein a compressive strength of the plugging composition increases to in a range of from about 50 psi to about 1,000 psi over a period of from about 5 minutes to about 2 hours after it contacts the water.

29. The method of claim 23, wherein the plugging composition is pumped down through a conduit disposed in a wellbore.

30. The method of claim 23, wherein a mass flowrate ratio of the plugging composition to a water-containing fluid being pumped to the subterranean formation is in a range of from about 1:1 to about 10:1.

31. The method of claim 23, wherein the clay comprises attapulgite.

32. The method of claim 23, wherein the oil comprises diesel oil, mineral oil, kerosene, vegetable oils, synthetic oils, esters, olefins, or combinations thereof.

33. The method of claim 23, further comprising dissolving the set plugging composition with an acidic solution.

* * * * *